United States Patent
Lee et al.

(10) Patent No.: US 8,538,671 B2
(45) Date of Patent: Sep. 17, 2013

(54) APPARATUS AND METHOD FOR DETECTING POSITION AND ORIENTATION OF MOBILE OBJECT

(75) Inventors: Jae-Yeong Lee, Daejeon (KR); Wonpil Yu, Daejeon (KR)

(73) Assignees: Electronics and Telecommunications Research Institute, Daejeon (KR); SK Telecom Co., Ltd., Seoul (KR)

( * ) Notice: Subject to any disclaimer, the term of this patent is extended or adjusted under 35 U.S.C. 154(b) by 608 days.

(21) Appl. No.: 12/632,236

(22) Filed: Dec. 7, 2009

(65) Prior Publication Data
US 2010/0161224 A1    Jun. 24, 2010

(30) Foreign Application Priority Data
Dec. 22, 2008  (KR) .......................... 10-2008-0131784

(51) Int. Cl.
*G06F 17/10*  (2006.01)

(52) U.S. Cl.
USPC .......................................................... 701/300

(58) Field of Classification Search
USPC ................. 700/245, 251, 259; 701/408, 412, 701/469, 300
See application file for complete search history.

(56) References Cited

U.S. PATENT DOCUMENTS
2003/0236590 A1*  12/2003  Park et al. .................... 700/245

FOREIGN PATENT DOCUMENTS
| JP | 2004-21978 | 1/2004 |
| JP | 2008-291748 | 12/2008 |
| KR | 2003-0095492 | 12/2003 |
| KR | 10-2007-0054557 | 5/2007 |

\* cited by examiner

*Primary Examiner* — Kim T Nguyen
(74) *Attorney, Agent, or Firm* — Staas & Halsey LLP

(57) ABSTRACT

An apparatus for detecting a position and orientation of a mobile object includes: a relative position detection unit for acquiring a relative position with respect to movement of the mobile object; an absolute position detection unit for acquiring an absolute position of the mobile object; and a position updating unit for updating the position and orientation of the mobile object based on an initial or previous position of the mobile object and the relative position. The apparatus further includes: a position correction unit for updating a current position of the mobile object with the absolute position, and correcting the orientation of the mobile object by setting an orientation of the mobile object in the relative position equal to an orientation of the mobile object in the absolute position.

16 Claims, 3 Drawing Sheets

APPARATUS AND METHOD FOR DETECTING POSITION AND ORIENTATION OF MOBILE OBJECT

CROSS-REFERENCE(S) TO RELATED APPLICATIONS

The present invention claims priority of Korean Patent Application No. 10-2008-0131784, filed on Dec. 22, 2008, which is incorporated herein by reference.

FIELD OF THE INVENTION

The present invention relates to position and orientation detection of a mobile object, and more particularly, to an apparatus and method for detecting a position and orientation of a mobile object, which are capable of accurately providing not only position information of the mobile object but also orientation information thereof, by accurately correcting the position and orientation of the mobile object with combination of an absolute position detection unit for acquiring an absolute position of the mobile object and a relative position detection unit for acquiring a relative position change caused by movement of the mobile object.

BACKGROUND OF THE INVENTION

Generally, for autonomous running of a mobile object such as a mobile robot and an intelligent vehicle, it is necessary to detect in real time which point of a map the mobile object currently exists and which orientation the mobile object heads for. Particularly, since a same control command completely changes a next proceeding orientation depending on the orientation of the robot and vehicle, orientation information is a very important factor in movement control of the mobile object.

A variety of methods using radio wave, ultrasonic wave, RFID (Radio Frequency IDentification), image recognition and odometry are used for a position detection unit for detecting the position of the mobile object. Although some of position detection units provide orientation information with position information, most of them provide only position information.

For example, a global positioning system (GPS) can provide an absolute position within a very wide range, but cannot provide orientation information of the mobile object. A remote camera can relatively easily sense the mobile object and check its position via image recognition, but needs advanced image processing to check the orientation of the mobile object or needs to attach an orientation indicator to the mobile object.

In addition, when the position detection unit which cannot provide the orientation information is employed, a method for calculating a movement orientation vector from mobile object's position differences of a mobile object with a lapse of time, and determining the movement orientation as a current heading of the mobile object has been generally used to determine the orientation of the mobile object. However, this method has a disadvantage in that accurate orientation information is not provided, when the mobile object rotates in one place or moves in a curved route.

Moreover, an odometry method using an odometer is also used for detecting a position of a mobile object. This method measures a rotation number of a wheel by using an encoder sensor attached onto the wheel, and detects a relative position change of the mobile object by using an interval between the wheels and a diameter of the wheel. The method using the odometry provides a very high sampling rate and a relatively high precision in a short distance. Since, however, it reflects only a relative position change from a previous position, an error is accumulated due to sliding of the wheels or the like with increase of a running distance.

That is, as described above, the conventional position detection methods using the ultrasonic wave, radio wave, remote camera, or the like are not capable of providing the orientation information and high sampling rate, so that they are not preferably applied to the position detection unit for the autonomous running of the mobile object.

SUMMARY OF THE INVENTION

Therefore, the present invention provides an apparatus and method for detecting a position and orientation of a mobile object in real time at a high sampling rate by complementarily combining an absolute position detection unit and a relative position detection unit, where the absolute position detection unit does not provide orientation information.

In accordance with an aspect of the present invention, there is provided an apparatus for detecting a position and orientation of a mobile object, including: a relative position detection unit for acquiring a relative position with respect to movement of the mobile object; an absolute position detection unit for acquiring an absolute position of the mobile object; a position updating unit for updating the position and orientation of the mobile object based on an initial or previous position of the mobile object and the relative position; and a position correction unit for updating a current position of the mobile object with the absolute position, and correcting the orientation of the mobile object by setting the moving direction of the mobile object in the relative position equal to the moving direction of the mobile object in the absolute position.

In accordance with another aspect of the present invention, there is provided a method for detecting a position and orientation of a mobile object, including: acquiring a relative position with respect to movement of the mobile object; updating a current position of the mobile object with the absolute position; acquiring an absolute position of the mobile object; updating the position and orientation of the mobile object based on an initial position of the mobile object and the relative position; and correcting the orientation of the mobile object by setting the moving direction of the mobile object in the relative position equal to the moving direction of the mobile object in the absolute position.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE EMBODIMENT

Hereinafter, the operational principle of the present invention will be described in detail with reference to the accompanying drawings.

Figure 1:
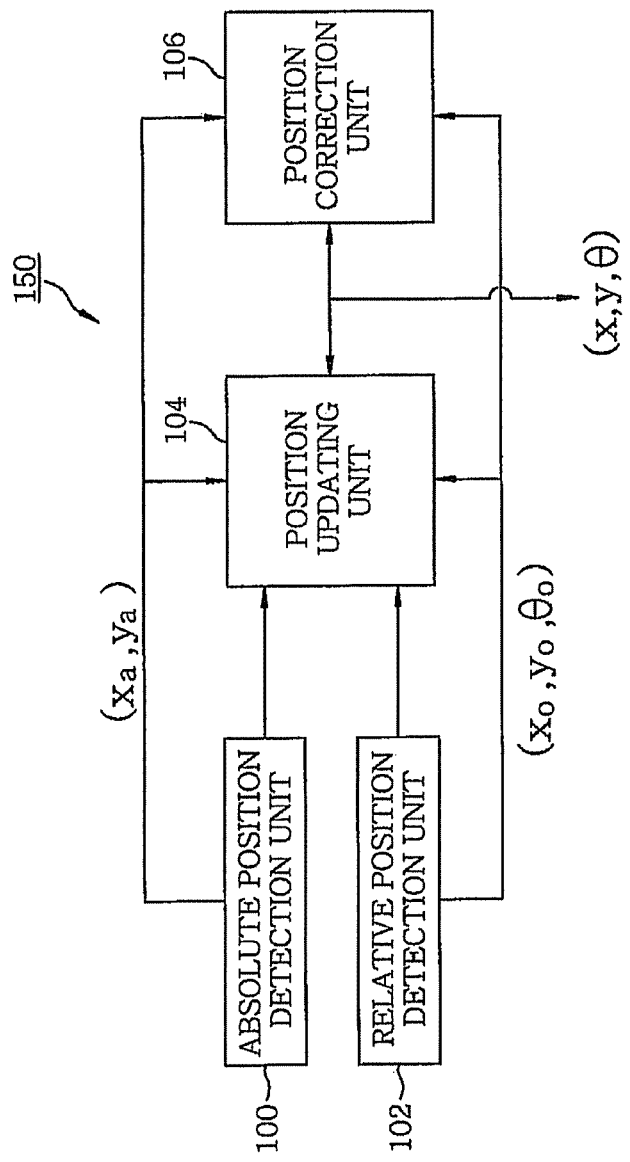
FIG. 1 illustrates a block diagram of an apparatus for detecting a position and orientation of a mobile object in accordance with an embodiment of the present invention.

FIG. 1 illustrates a block diagram of an apparatus 150 for detecting a position and orientation of a mobile object in accordance with an embodiment of the present invention. The apparatus 150 for detecting the position and orientation of the mobile object shown in FIG. 1 includes an absolute position detection unit 100, a relative position detection unit 102, a position updating unit 104 and a position correction unit 106.

Referring to FIG. 1, the absolute position detection unit 100 provides an absolute position $(x_a, y_a)$ of the mobile object. Here, when the mobile object is three-dimensional, it provides three-dimensional coordinates $(x_a, y_a, z_a)$ information regarding the position of the mobile object.

When the mobile object moves, the relative position detection unit 102 acquires a relative position change caused by the movement of the mobile object by using odometry at specific periods of time to provide a relative position $(x_o, y_o, \theta_o)$ of the mobile object. Here, subscript 'a' denotes 'absolute', and 'o' denotes 'odometry'.

The position updating unit 104 updates the position and orientation of the mobile object based on an initial position (or previous position) of the mobile object and the relative position acquired by the relative position detection unit 102 thereby obtaining position and orientation $(x, y, \theta)$ of the mobile object.

The position correction unit 106 corrects a current position of the mobile object by using the absolute position of the mobile object acquired by the absolute position detection unit 100, and corrects the orientation of the mobile object by setting the moving direction of the mobile object in the relative position acquired by the relative position detection unit 102 equal to the moving direction of the mobile object in the absolute position, thereby obtaining the position and orientation $(x, y, \theta)$ of the mobile object.

Here, the absolute position detection unit 100, which is means for acquiring the absolute position of the mobile object, may be applied with one of various conventional position detection means and products, and the relative position detection unit 102, which is means for acquiring the relative position of the mobile object, may use odometry information obtained by a gyroscope or an encoder sensor.

Figure 2:
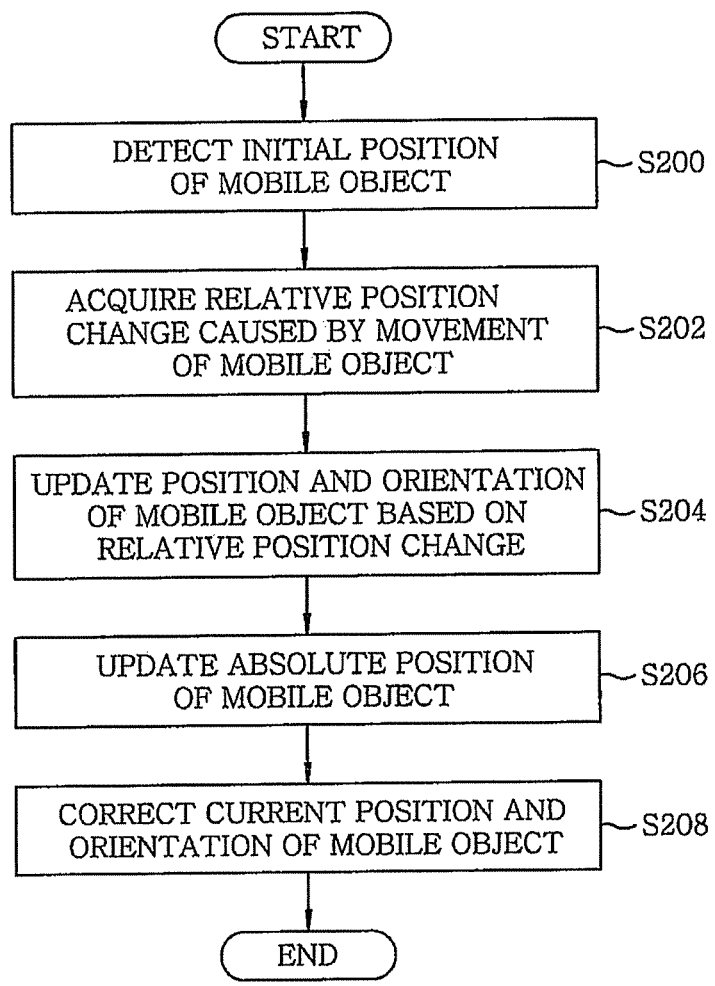
FIG. 2 shows a flowchart of operation control for detecting a position and orientation of a mobile object in accordance with an embodiment of the present invention.

Hereinafter, the embodiment of the present invention will be explained in detail with reference to FIGS. 1 and 2. FIG. 2 illustrates an operation control flow for detecting a position and orientation of a mobile object in accordance with an embodiment of the present invention. For convenience, a process for detecting a position of a two-dimensional mobile object will be exemplified as a process for detecting a position of a mobile object in accordance with the present invention. However, it should be noted that the present invention is also applicable to a three-dimensional mobile object as well as the two-dimensional mobile object in the same manner.

First of all, in step S200, the apparatus 150 for detecting the position and orientation of the mobile object determines an initial position of the mobile object based on an initial absolute position. The orientation of the mobile object is determined after the mobile object moves from the initial position over a certain distance.

Once the position and orientation of the mobile object are determined as described above, while the mobile object moves, the relative position detection unit 102 acquires a relative position of the mobile object by using odometry information in step S202, and the position updating unit 104 updates the position and orientation of the mobile object on the basis of the initial (previous) position/orientation and relative position of the mobile object in step S204.

Thereafter, in step S206, the position correction unit 106 updates the position of the mobile object to an absolute position whenever the absolute position is acquired through an absolute position detection unit 100. If the acquired absolute position is in a specific distance away from the previous absolute position, in step S208, the position correction unit 106 matches a locus of the relative position with a locus of the absolute position, to thereby correct the orientation of the mobile object.

That is, the method for detecting the position and orientation of the mobile object in accordance with the embodiment of the present invention basically updates the position of the mobile object on the basis of the odometry, and corrects the position and orientation of the mobile object when the absolute position is periodically inputted. Here, since the odometry seldom has an error in a short distance, if the periodically updated absolute position is accurate, an accurate position can be obtained.

Hereafter, a process of updating and correcting the position and orientation of the mobile object in the position updating unit 104 and the position correction unit 106 of the apparatus 150 for detecting the position and orientation of the mobile object will be explained in more detail.

First of all, the process for updating the position of the mobile object by using the odometry which provides a relative position will be described.

Normally, when the mobile object such as a robot is firstly driven, the odometry is initialized into (0,0,0). As the mobile object moves, the odometry is updated in real time based on a rolling degree of both wheels. However, it has been well-known that this odometry value is not an actual absolute position of the mobile object, but a relative position and orientation from a driving start point of the mobile object.

Figure 3:
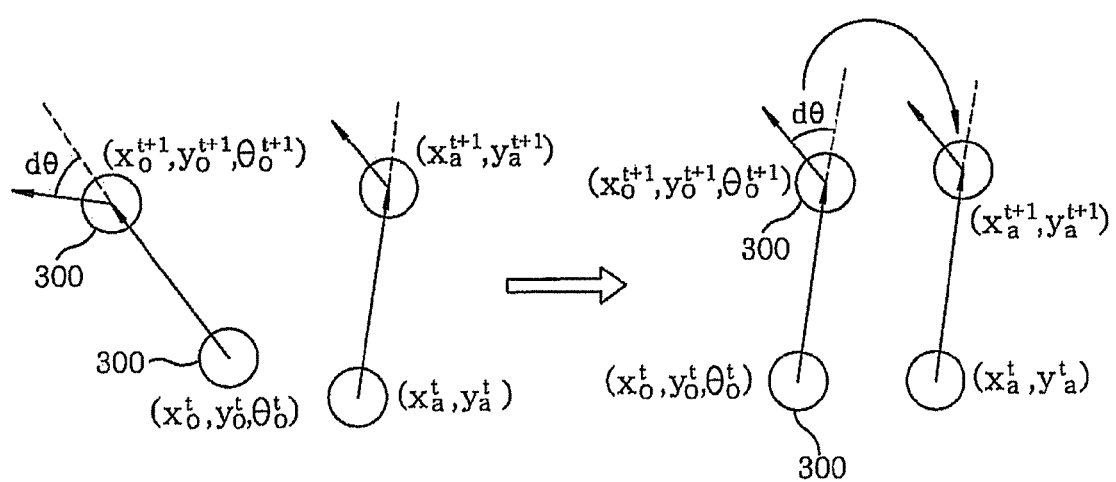
FIG. 3 shows orientation correction of a mobile object by using odometry information.

For example, as shown in FIG. 3, when the position and orientation of the mobile object at time t are $(x^t, y^t, \theta^t)$ and the odometry value at time t is $(x_o^t, y_o^t, \theta_o^t)$, if the odometry value at time t+1 is $(x_o^{t+1}, y_o^{t+1}, \theta_o^{t+1})$, the position and orientation of the mobile object at time t+1 are updated as follows:

$$x^{t+1} = x^t + \Delta T \cos(\theta' + \Delta\theta)$$

$$y^{t+1} = y^t + \Delta T \sin(\theta' + \Delta\theta)$$

$$\theta^{t+1} = \theta' + (\theta_o^{t+1} - \theta'_o) \quad \text{Eq. 1}$$

where, $\Delta T = \sqrt{(x_o^{t+1} - x_o^t)^2 + (y_o^{t+1} - y_o^t)^2}$ $\Delta\theta = a\tan 2(y_o^{t+1} - y_o^t, x_o^{t+1} - x_o^t) - \theta'_o$, wherein $\Delta T$ represents a translational movement distance, and $\Delta\theta$ represents a rotational movement.

Next, the process for updating the position of the mobile object based on the absolute position will be described.

As the foregoing position updating process by using the odometry, in the position correction process by using the absolute position, e.g., as shown in FIG. 3, when the position and orientation of the mobile object at time t are $(x^t, y^t, \theta^t)$, the odometry value at time t is $(x_o^t, y_o^t, \theta_o^t)$, and the odometry value at time t+1 is $(x_o^{t+1}, y_o^{t+1}, \theta_o^{t+1})$, if the acquired absolute position at time t+1 is $(x_a^{t+1}, y_a^{t+1})$, the position and orientation of the mobile object at time t+1 are corrected by the following equation:

$$x^{t+1} = x_a^{t+1}$$

$$y^{t+1} = y_a^{t+1}$$

$$\theta^{t+1} = a\tan 2(y^{t+1} - y^t, x^{t+1} - x^t) + d\theta \quad \text{Eq. 2}$$

where $d\theta = \theta_o^{t+1} - a\tan 2(y_o^{t+1} - y_o^t, x_o^{t+1} - x_o^t)$, wherein dθ represents an angular difference between the heading direction of the mobile object at time t+1 and the moving direction from time t to time t+1 in odometry.

That is, the concept of the position updating processes in accordance with the present invention is as follows. First, the position and orientation of the mobile object can be obtained at a high sampling rate by using the odometry. However, since the position is updated by reflecting the relative position change value from the previous position, an error can be accumulated with the lapse of time. Therefore, whenever the absolute position is acquired, the position of the mobile object is updated, to thereby remove the accumulated error. Then, the position updating process using the odometry is performed on the basis of the newly corrected position, and thus, the error is not increased.

However, the acquired absolute position does not have orientation information. Accordingly, if only the position value is corrected, an orientation error is still accumulated. To solve this problem, the movement orientation of the mobile object from time t to time t+1 is taken into consideration, and therefore, the orientation of the mobile object is corrected to make the movement orientation detected by using the odometry to be equal to the movement orientation detected by using the absolute position. Therefore, the error accumulation is prevented and precise orientation information can be obtained.

Meanwhile, in accordance with the method for correcting the orientation of the mobile object using the absolute position, when the mobile object such as a robot stops in one place or a position change between time t and time t+1 is small, the calculation of the movement orientation of the mobile object is difficult or unstable. Accordingly, it is more preferable to memorize the previous absolute position and odometry information, and correct the orientation only when the newly acquired absolute position is in more than a specific distance away from the previous absolute position than to correct the orientation of the mobile object whenever the absolute position is acquired, details of which will be given below.

First of all, when the absolute position is firstly acquired, the absolute position and an odometry value at a corresponding time point are stored together. Thereafter, when the absolute position is acquired again, a distance between the acquired absolute position and the stored absolute position is calculated. If a calculated distance is larger than a specific threshold value, the orientation is corrected as described above, and the stored absolute position and odometry value are updated with a value at a current time point. If the calculated distance is smaller than the specific threshold value, only the position of the mobile object is corrected into the new absolute position, but the orientation of the mobile object is not corrected. In this case, the previously stored absolute position and odometry value are not updated but maintained.

As discussed earlier, in accordance with the apparatus and method for detecting the position and orientation of the present invention, even when the absolute position detection unit does not provide the orientation information, the position and orientation are corrected by combination with the relative position detection unit for acquiring the relative position with respect to movement displacement of the mobile object, thereby detecting the position and orientation of the mobile object more precisely.

In addition, in accordance with the present invention, since the position and orientation detection error is not accumulated with the lapse of time but restricted within a certain range, it is possible to establish a stable position detection system and to apply a variety of position detection unit as position detection unit for autonomous running of the mobile object such as a mobile robot and intelligent vehicle. Further, when the absolute position detection unit for providing the orientation information provides low accuracy orientation information, it is possible to considerably improve the accuracy of the orientation information by adopting the method of the present invention.

While the invention has been shown and described with respect to the embodiments, it will be understood by those skilled in the art that various changes and modification may be made.

What is claimed is:

1. An apparatus for detecting a position and orientation of a mobile object, comprising:
   a relative position detection unit for acquiring a relative position and orientation of the mobile object with respect to a previous relative position and orientation of the mobile object;
   an absolute position detection unit for acquiring an absolute position of the mobile object;
   a position updating unit for updating the position and orientation of the mobile object based on a previous position and orientation of the mobile object and the relative position and orientation of the mobile object; and
   a position correction unit for correcting the position and orientation of the mobile object in accordance with the following equation:

$$x^{t+1} = x_a^{t+1}$$

$$y^{t+1} = y_a^{t+1}$$

$$\theta^{t+1} = a\tan2(y^{t+1} - y^t, x^{t+1} - x^t) + d\theta$$

where, $d\theta = \theta_o^{t+1} - a\tan2(y_o^{t+1} - y_o^t, x_o^{t+1} - x_o^t)$, and
where, $(x^{t+1}, y^{t+1}, \theta^{t+1})$ represents a corrected position and orientation of the mobile object $(x_a^{t+1}, y_a^{t+1})$ represents the absolute position of the mobile object obtained by the absolute position detection unit, $(x^t, y^t)$ represents the previous position of the mobile object, $(x_o^t, y_o^t)$ represents the previous relative position of the mobile object obtained by the relative position detection unit, and $(x_o^{t+1}, y_o^{t+1}, \theta_o^{t+1})$ represents the relative position and orientation of the mobile object obtained by the relative position detection unit.

2. The apparatus of claim 1, wherein, whenever the absolute position of the mobile object is acquired, the position correction unit corrects the position of the mobile object.

3. The apparatus of claim 1, wherein, when the absolute position of the mobile object is acquired while a previously acquired absolute position of the mobile object exists, the position correction unit calculates a distance between the acquired absolute position and the previously acquired absolute position, and corrects the orientation of the mobile object when the distance between the absolute positions is equal to or greater than a specific distance.

4. The apparatus of claim 1, wherein the absolute position detection unit provides a firstly acquired absolute position of the mobile object as the previous position of the mobile object.

5. The apparatus of claim 1, wherein the absolute position detection unit acquires the absolute position of the mobile object at predetermined periods of time.

6. The apparatus of claim 1, wherein the relative position detection unit calculates the relative position of the mobile object by using odometry or gyroscope.

7. The apparatus of claim 1, wherein the absolute position detection unit is a GPS or remote camera.

8. The apparatus of claim 1, wherein the mobile object is a mobile robot or vehicle.

9. A method for detecting a position and orientation of a mobile object, comprising:
acquiring a relative position and orientation of the mobile object with respect to a previous relative position and orientation of the mobile object using a relative position detection unit;
updating the position and orientation of the mobile object based on a previous position of the mobile object and the relative position and orientation of the mobile object;
acquiring an absolute position of the mobile object using an absolute position detection unit; and
correcting the position and orientation of the mobile object in accordance with the following equation:

$$x^{t+1} = x_a^{t+1}$$

$$y^{t+1} = y_a^{t+1}$$

$$\theta^{t+1} = a\tan2(y^{t+1}-y^t, x^{t+1}-x^t) + d\theta$$

where, $d\theta = \theta_o^{t+1} - a\tan2(y_o^{t+1}-y_o^t, x_o^{t+1}-x_o^t)$, and
where, $(x^{t+1}, y^{t+1}, \theta^{t+1})$ represents a corrected position and orientation of the mobile object $(x_a^{t+1}, y_a^{t+1})$ represents the absolute position of the mobile object obtained by the absolute position detection unit, $(x^t, y^t)$ represents the previous position of the mobile object, $(x_o^t, y_o^t)$ represents the previous relative position of the mobile object obtained by the relative position detection unit, and $(x_o^{t+1}, y_o^{t+1}, \theta_o^{t+1})$ represents the relative position and orientation of the mobile object obtained by the relative position detection unit.

10. The method of claim 9, wherein, whenever the absolute position of the mobile object is acquired, said correcting is performed.

11. The method of claim 9, wherein said correcting includes:
when the absolute position of the mobile object is acquired while a previously acquired absolute position of the mobile object exists, calculating a distance between the acquired absolute position and the previously acquired absolute position; and
correcting the orientation of the mobile object when the distance between the absolute positions is equal to or greater than a specific distance.

12. The method of claim 9, wherein the previous position of the mobile object is set to a firstly acquired absolute position when the mobile object starts to move.

13. The method of claim 9, wherein the absolute position of the mobile object is acquired at predetermined periods of time while the mobile object moves.

14. The method of claim 9, wherein the relative position of the mobile object is acquired by using odometry or gyroscope.

15. The method of claim 9, wherein the absolute position of the mobile object is acquired through a GPS or remote camera.

16. The method of claim 9, wherein the mobile object is a mobile robot or vehicle.

* * * * *